United States Patent Office 3,157,434
Patented Nov. 17, 1964

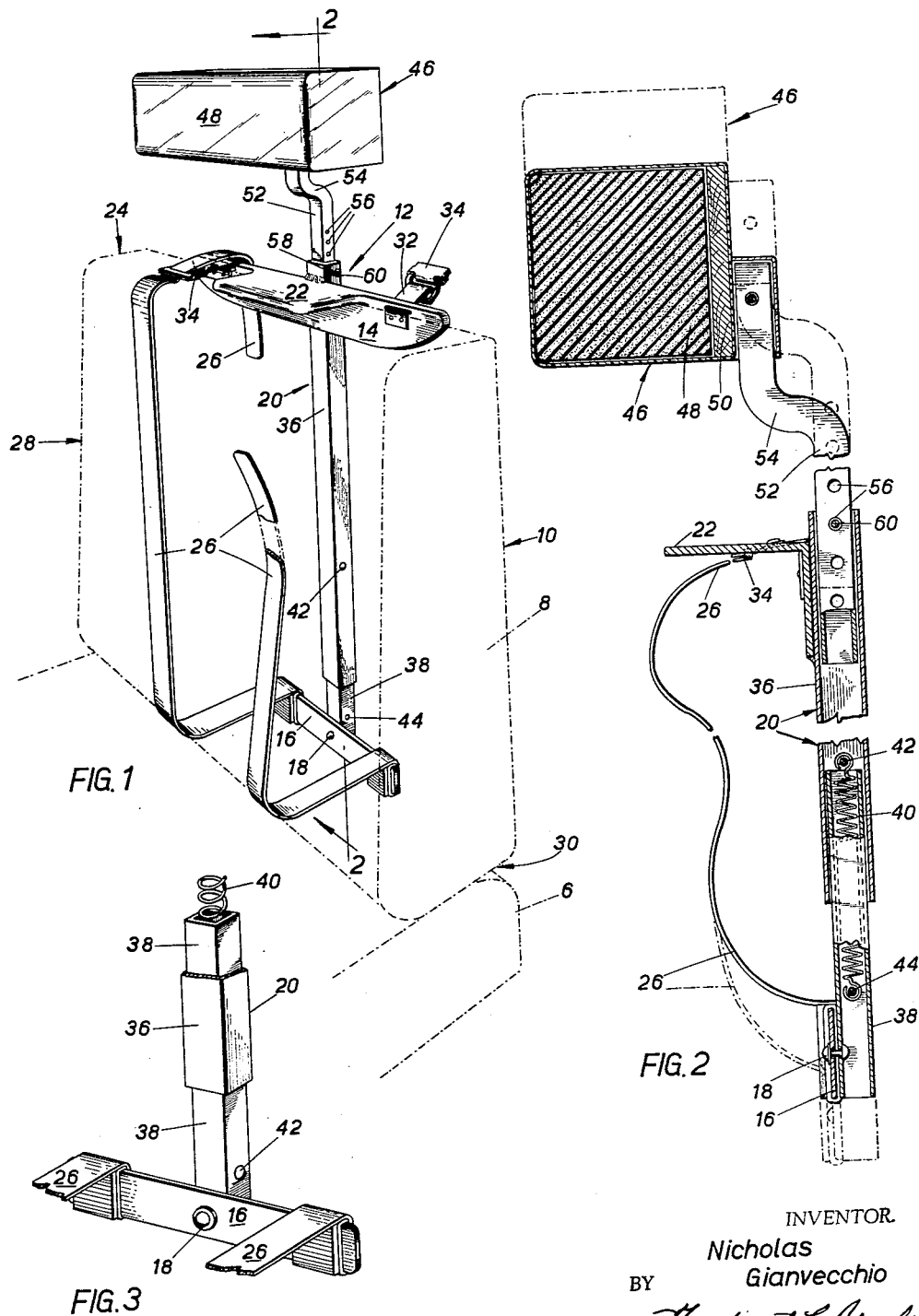

3,157,434
HEAD REST ATTACHMENTS FOR
AUTOMOBILE SEATS
Nicholas Gianvecchio, 82 Woodrow Ave., Toronto,
Ontario, Canada
Filed July 15, 1963, Ser. No. 294,906
3 Claims. (Cl. 297—397)

My invention relates to improvements in head rests and particularly concerns a head rest for use on an automobile seat. Owing to the hazards of present day traffic conditions there has been an increasing necessity for equipping automobile seats with head rests to provide support for the head of an occupant in case of collisions or abrupt braking of the vehicle resulting in an occupant being thrown forwardly and then jerked backwardly with a backlash effect which is often injurious to the neck. The aim of my invention is to provide a highly desirable and serviceable head rest attachment which can be readily applied to the back portion of an ordinary automobile seat and adjusted to suit the needs of the user.

A further object of my invention is to provide a head rest attachement of the kind referred to which is adapted to be strapped securely to the back of an automobile seat, and which is not only adapted to afford adequate protection against backlash stress but is also devised to support the head of an occupant in comfort.

The invention has as a still further object to provide a head rest attachment of the character referred to which is so constructed and arranged as to be adjustable thereof transversely of an automobile seat and also vertically whereby it may be located positionally to conform to the needs of the occupant. A still further aim is to provide a head rest of this kind which is inexpensive to manufacture and which can be adjusted to fit on seats of different makes of automobiles.

With these and subsidiary objects in view the invention consists in the novel construction and arrangement of parts as described in the ensuing specification and shown in the attached drawing forming a part thereof.

In the drawing:

FIG. 1 is a view in perspective of the head rest attachment applied to the back of an totomobile seat, shown in dot-and-dash lines. One of the two straps is depicted as unfastened in order that the construction and arrangement may be better understood;

FIG. 2 is a vertical sectional view on line 2—2 of FIG. 1 but omitting the seat and showing the head rest proper in a second position in dot-and-dash lines; and FIG. 3 is an enlarged fragmentary perspective view of the post and the lower cross member carried thereby.

My invention is devised to be used on a standard automobile seat such as that represented in FIG. 1 at 6, and having the usual back indicated at 8. The head rest attachement comprises an attachment assembly including a rigid support for extending upwardly at the rear surface 10 of the seat back 8. The attachment assembly is generally denoted at 12 and includes a top part 14 and a bottom part 16. The top part 14 is a cross member which is fixed and said lower part 16 is also a cross member but is pivoted at 18 in order that it may rock.

The rigid support is denoted at 20 and the upper cross member 14 is rigid therewith. A bearing plate 22 is integral with the top cross member 14 and projects forwardly thereof for resting upon the top edge portion 24 of the seat back 8. Flexible elements 26 are attached to said top and bottom cross members 41 and 16 respectively and pass around the front surface 28 of the seat back and also around said top edge portion 24 and the bottom edge portion 30. These flexible elements are shown as straps and may be made of leather, fabric or other suitable material. Each strap is formed in two parts and includes a long part secured to the cross member 16 and a short or stub part 32 made fast to the top cross member 14 and provided with tensioning means in the form of a conventional fastener 34 which may be a buckle which connects with the long strap, as will be well understood in the art.

The straps are tightened to firmly draw the rigid support 20 against the rear surface of the seat back and to secure it firmly in position in conjunction with the bearing plate 22. The pivotal connection 18 of the lower cross member 16 tends to equalize the stress of the tightened straps and enables a more firm attachment to be effected.

The rigid support 20 is a post, and in order to accommodate seat backs of different depths it is desirable that the post be adjustable in order that its length may be increased or decreased as occasion may require in applying the head rest attachment to different makes of automobiles. Preferably, the post is of a telescopic construction and comprises a main telescopable element designated at 36 to which the cross member 14 is secured at the upper end thereof and in which a lower telescopable element 38 is sleeved. Preferably the telescopable elements are held in assembly by means of a helical tension spring 40 which is internally disposed and anchored at its inner end by a pin 42 lodged in the main telescopic section 38. The outer end is similarly secured by a pin 44 lodged in the inner telescopic section 38. The spring is normally tensioned and it stresses the lower section 38 inwardly of the outer section and a pin 42 which acts as a stop for limiting inward movement of the inner section 38. Accordingly the post may be elongated by with drawing the innner element 38 against the tension of spring 40 to the extent necessary to cause the post to fit a seat back which is of increased depth.

As an alternative construction the spring may be dispensed with and means may be provided, such as a thumb screw, to secure the two telescopable elements in different positions of adjustment.

The head rest element proper is generally denoted at 26 and comprises a cushioning member 48 of covered sponge rubber, plastic foam material, or the like, which yieldable material is carried by a foundation plate 50— see FIG. 2. Rigid with the plate 50 is a depending mounting member 52 which has a goose neck section 54 which forwardly offsets the cushioning element 48. Member 52 is sleeved in the upper end of the tubular post element 36. This provides an extensile arrangement whereby the head rest proper may be raised or lowered as desired and held in a selected position as by fastening means. Suitable fastening means of a known type may be employed to retain the mounting member 52 in set position. The securing means is shown by way of example as comprising a longitudinal series of holes 56 provided in the lower end of the mounting member 52 and a single hole 58 provided in the upper end of the post element 36 for receiving a cotter pin or the like 60. The cotter pin, of course, is placed in one of the holes 56 which gives the desired elevational adjustment.

From the preceding description it will be manifest that my invention provides an extremely rugged and serviceable head rest attachment for the seat of an automobile and one which by virtue of its construction and arrangement can be applied firmly and securely to take imposed stresses incidental to usage of the device. Having shown and described a selected embodiment of the invention it will be understood that such changes and modifications may be resorted to as fairly come within the scope of the subjoined claims.

What I claim is:

1. A head rest attachment for vehicle seats comprising an elongated rigid support for engaging the rear surface of a vehicle seat, an elongated lower cross member freely, intermediately pivoted at a lower portion of said rigid support, an elongated upper cross member extending transversely of and fixedly secured to an upper portion of said support, said upper cross member including a laterally projecting bearing plate for engaging the upper edge of said vehicle seat, a pair of flexible, separable belt assemblies at respective terminal ends of said cross members for engagement on the forward surface of said vehicle seat to mount the attachement thereon, and a head rest element mounted on the upper end of said support and including a cushioning member projecting forwardly of said bearing plate.

2. The structure as claimed in claim 1 in which said support includes an upwardly opening tubular socket portion, said head rest element comprising a rod-like mounting member removably received in said tubular socket portion.

3. The structure as claimed in claim 2 in which said mounting member includes a plurality of vertically spaced transverse apertures, said tubular socket portion including a transverse aperture alignable with one of said transverse apertures in said mounting member, and a retaining element extendable through said aligned apertures for retaining said head rest element in an adjusted position.

References Cited in the file of this patent
UNITED STATES PATENTS

| | | |
|---|---|---|
| 1,234,571 | Robineau | July 24, 1917 |
| 2,490,088 | Penn | Dec. 6, 1949 |
| 3,018,133 | Mills | Jan. 23, 1962 |
| 3,084,978 | Johansson | Apr. 9, 1963 |